May 29, 1951 W. T. POWELL 2,555,245

TELEPHONE LINE MARKING SYSTEM

Filed May 23, 1947 4 Sheets-Sheet 1

INVENTOR.
WINFRED T. POWELL

BY T. L. Bowes

ATTORNEY

INVENTOR.
WINFRED T. POWELL
BY T. L. Bowes
ATTORNEY

INVENTOR.
WINFRED T. POWELL
BY T. L. Bowes
ATTORNEY

May 29, 1951 W. T. POWELL 2,555,245

TELEPHONE LINE MARKING SYSTEM

Filed May 23, 1947 4 Sheets-Sheet 4

INVENTOR.
WINFRED T. POWELL

BY T. L. Bowes

ATTORNEY

UNITED STATES PATENT OFFICE 2,555,245

TELEPHONE LINE MARKING SYSTEM

Winfred T. Powell, Rochester, N. Y., assignor to Stromberg-Carlson Company, a corporation of New York Application May 23, 1947, Serial No. 749,917

15 Claims. (Cl. 179—18)

This invention relates to electronic switching systems and it more particularly pertains to electronic control in automatic telephone systems.

The system of the present invention provides a novel method of marking or indicating the identity of a calling line in an automatic telephone system.

The present invention relates to improvements in automatic telephone systems of the character disclosed in Powell Patent 2,409,586, granted October 15, 1946, wherein line finders are employed to extend connections between calling lines and link circuits.

It is an object of the present invention to provide a subscriber's line circuit of the line lockout type which does not make use of the usual line relay, thus economizing in individual line equipment, since only two relays (cut-off relay and lockout relay) are needed for each line circuit.

An important feature of the present invention is the novel use of an electronic scanning device for registering and identifying the tens and units digits of a calling line and for thereafter controlling the operation of tens and units relays to extend a connection from the calling line to an idle link circuit.

Figure 1:
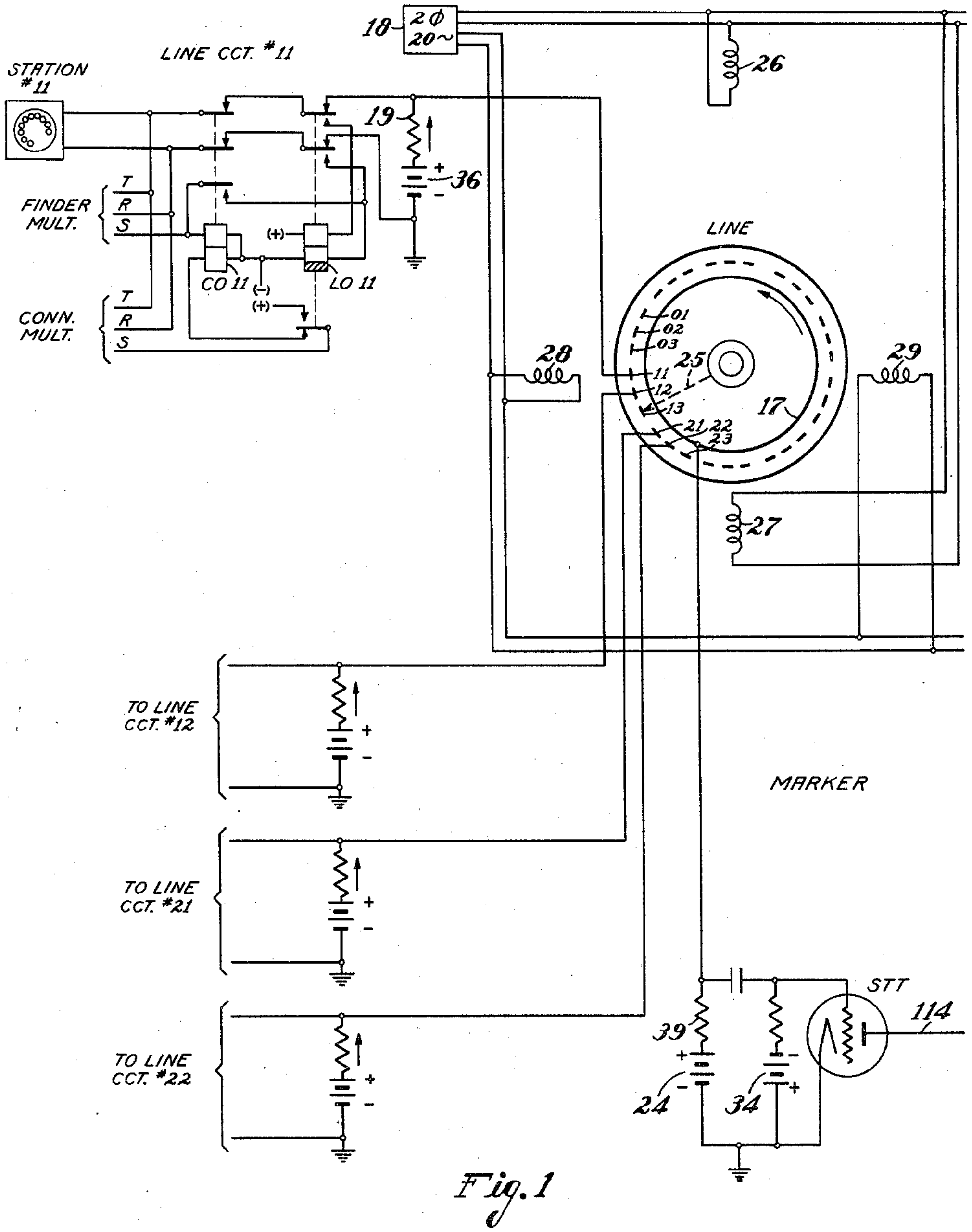
Figure 2:
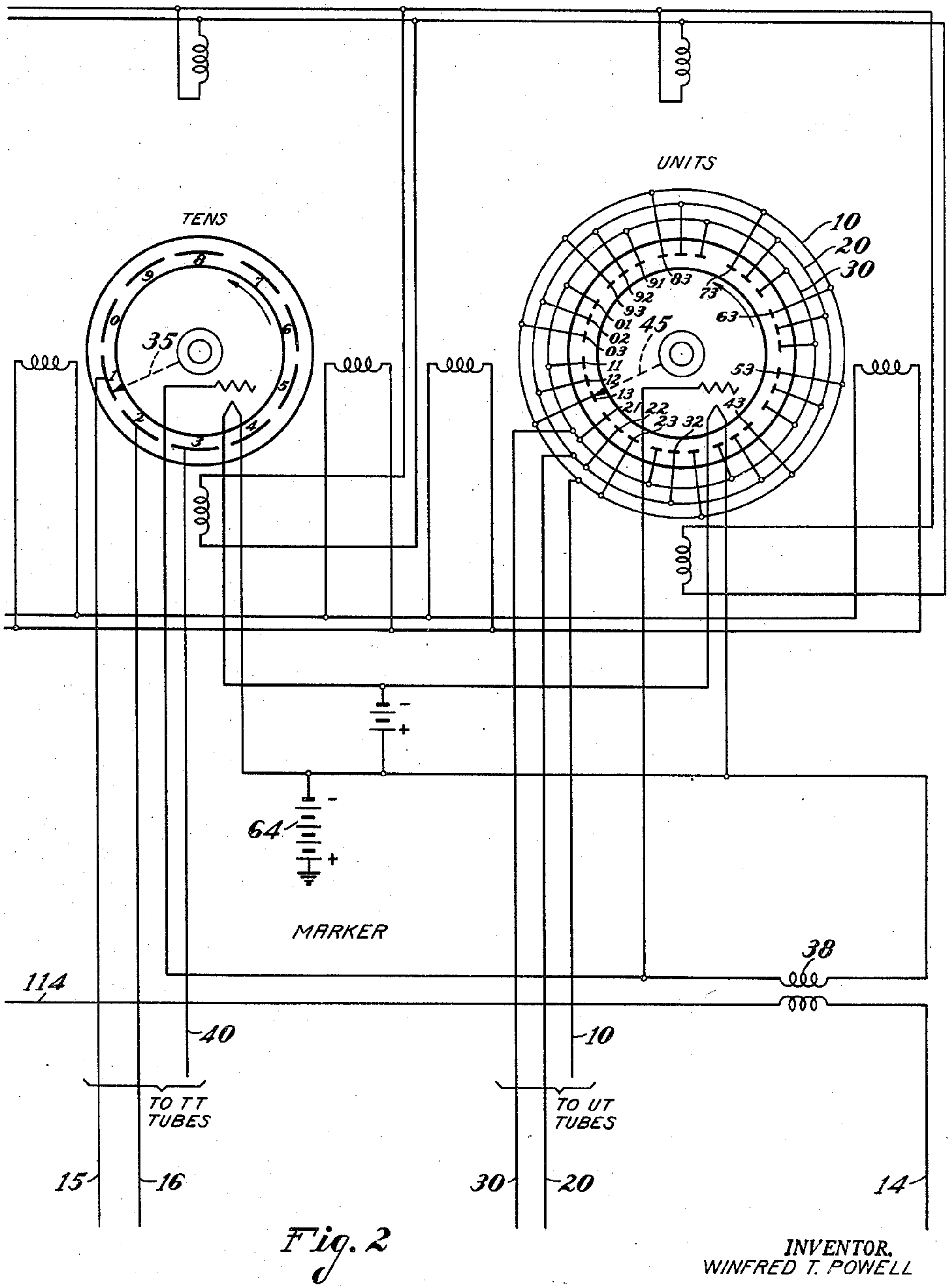
Figure 3:
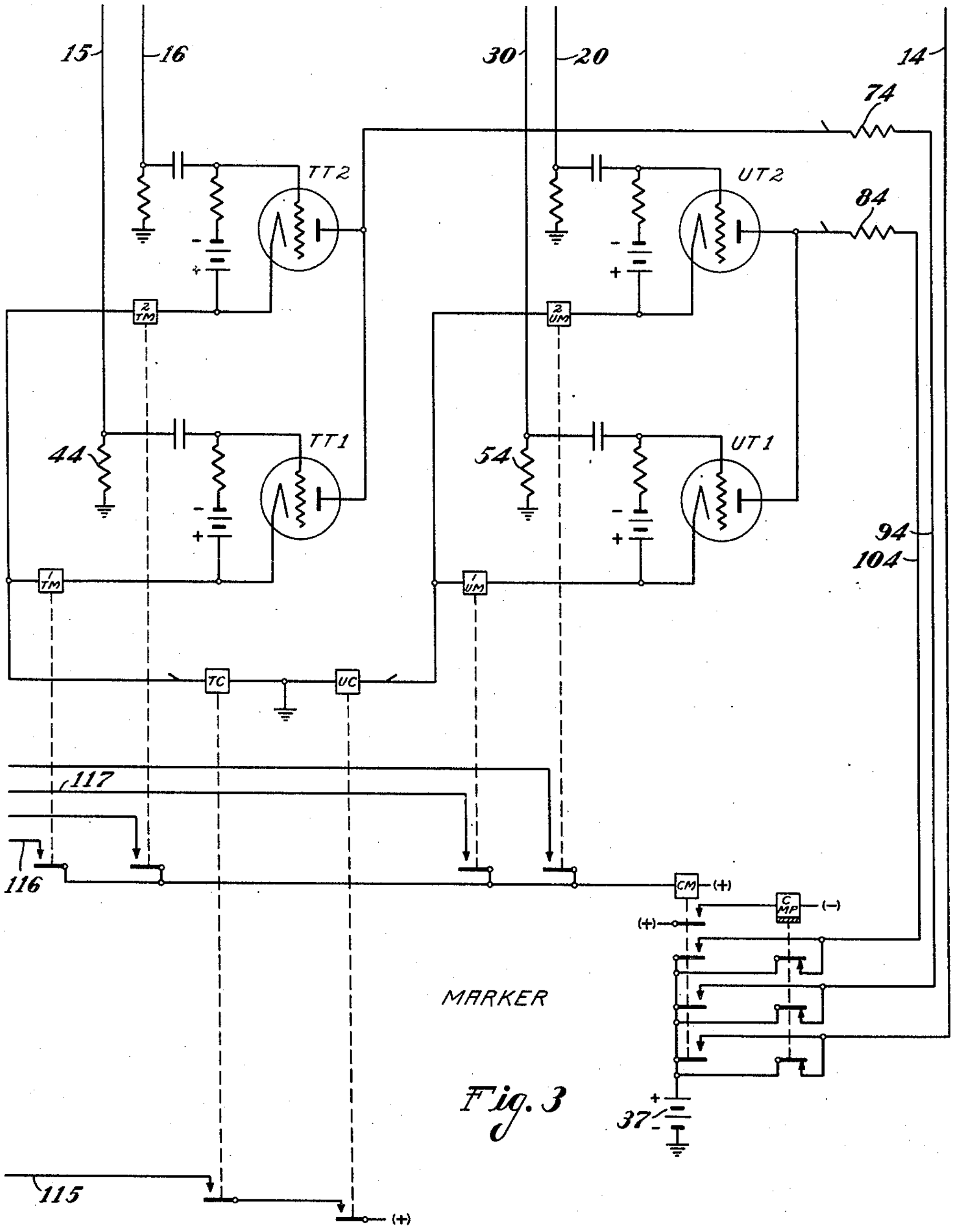
Figure 4:
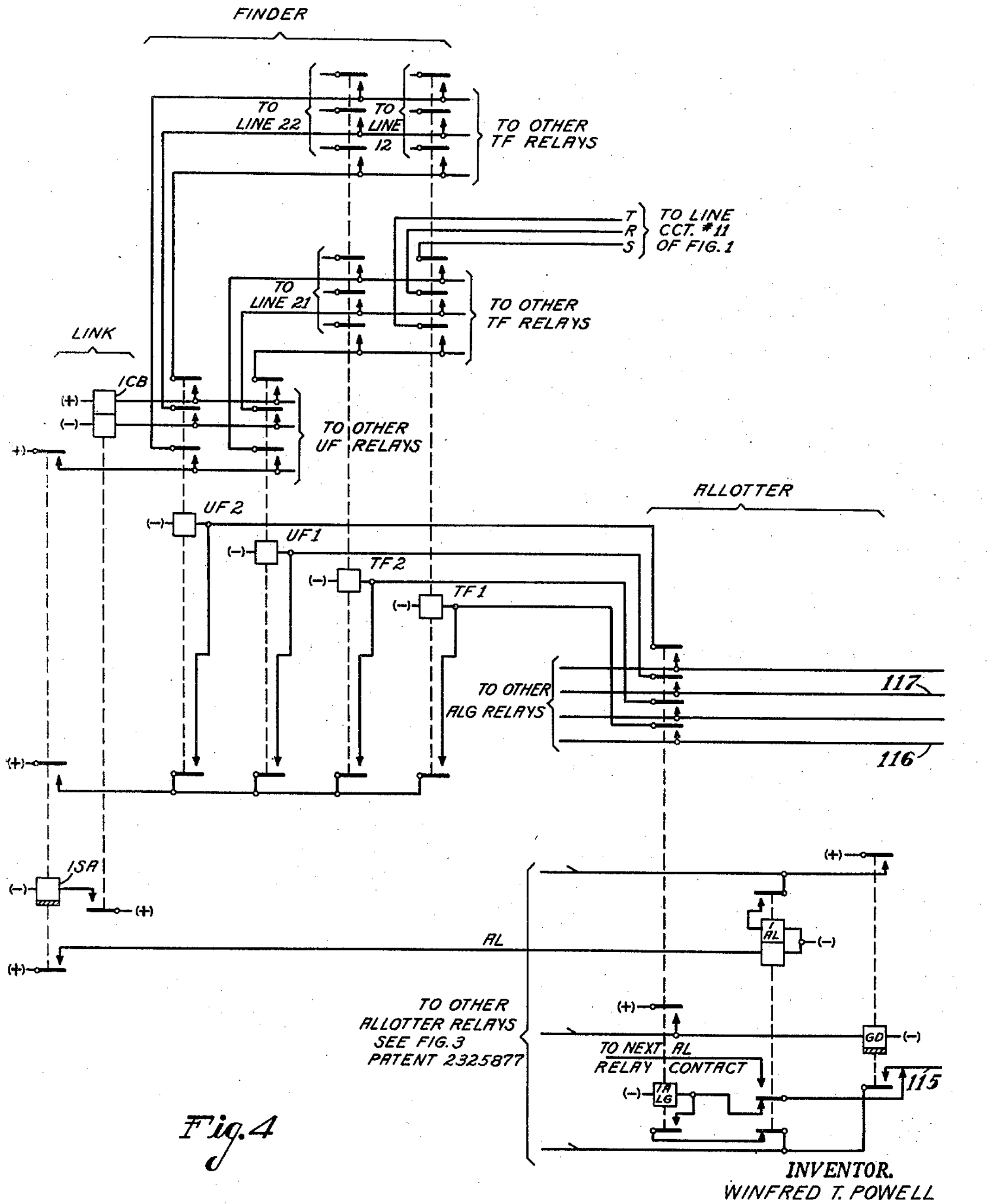

Other features and advantages of the present invention will be more apparent from a consideration of the following description in connection with the drawings in which:

Figs. 1, 2, 3 and 4, with Fig. 2 placed to the right of Fig. 1 and with Figs. 3 and 4 placed below Figs. 2 and 1 respectively and with correspondingly numbered lines in alignment, disclose a sufficient portion of an automatic telephone system for an understanding of the present invention.

The present disclosure shows only the line circuit, the marker circuit, a portion of the allotter circuit, a portion of the line finder circuit and a portion of the link circuit of an all-relay type automatic switching system. Reference is made to Powell Patent 2,325,877, issued August 3, 1943, for a detailed description of an all-relay type automatic switching system in which the present invention may be employed.

The present circuits, wherein electronic switching comprising electronic scanners and electronic markers are employed, can be used in the system of the above mentioned Patent 2,325,877 by replacing the line, marker and allotter circuits of this patent with the line, marker and allotter circuits, respectively of the present disclosure.

Only enough of the relay type line finder is shown at the left of Fig. 4 to illustrate how the calling line can be extended to the link, comprising calling bridge relay 1CB and slow acting relay 1SA, which relays correspond to similarly identified relays in Fig. 4 of Patent 2,325,877.

The marker disclosed in Figs. 1, 2 and 3 comprises electronic distributors or scanners which function in response to the initiation of a call to identify the calling line and to control gas tube circuits for marking the tens and units digits of this line. Such an electronic distributor is described in Skellet Patent 2,217,774, issued October 5, 1940.

A conductor for each line is connected from one side of the individual resistance associated with that line to an electrode within the electronic distributor, identified in Fig. 1 as the "line" portion of the distributor, it being understood that there are 100 electrodes in this portion of the distributor, one for each line of the 100 line group.

These electrodes are anodes, the potential of which is altered when the associated line initiates a call. Then when the electron beam strikes the anode a secondary electron emission is induced within the tube which, after suitable amplification operates a gas tube, which in turn operates a relay in its output circuit for marking the tens digit of the calling line.

A gas tube is also fired which corresponds to the units digit of the calling line for operating a relay in the output circuit of this tube for marking or identifying this particular units digit, all of which will be described in detail in the following description.

One start tube STT is common to 100 lines. There is one tens tube for each tens digit in the 100 line group, tens tubes TT1 and TT2 being shown in Fig. 3. There are also tens tubes TT3 to TT0, inclusive, which are not shown. Likewise, units tubes UT1 and UT2 shown in the right-hand portion of Fig. 3 are part of the group of ten units tubes, UT3 to UT0 not being shown. All of these three element tubes are of the gas filled type.

Line finder relays TF1, TF2 (and others up to and including TF0, not shown) and line finder relays UF1, UF2 (and others up to and including UF0, not shown) are part of the finder relays of a line finder link, such as disclosed in Fig. 4 of Patent 2,325,877.

Allotter relays 1AL, 1ALG and GD are part of an allotter group, such as disclosed in Fig. 3 of Patent 2,325,877, when modified to use only one slow release relay GD for each allotter group instead of one slow release relay, such as 1ALP for each link, as disclosed in the above mentioned patent.

There are three separate scanners or electron distributors indicated in Figs. 1 and 2 as "line," "tens" and "units." There are 100 electrodes circularly disposed within the tube or envelope of the "line" scanner. Electron beam 25 of the "line" scanner is caused to revolve around the ring 17 and to strike the electrodes in rotation. This beam is rotated or revolved by means of the 2 phase, 20 cycle supply 18 connected to the two sets of coils 26—27 and 28—29 outside the tube. This beam is deflected electromagnetically as described in the above mentioned Patent 2,217,774.

There are likewise 100 electrodes circularly disposed within the "units" scanner tube and in positions corresponding to those in the "line" scanner.

There are 10 electrodes circularly disposed within the "tens" scanner tube. Each of these electrodes is sufficiently long and is so located that it covers the positions of the electrodes in the "line" scanner having the same tens digit as the one in the "tens" scanner. In other words, electrode 1 in the "tens" scanner occupies the same relative position as the ten electrodes of the "line" scanner having tens digit 1, together with the spaces between, and so on for the other electrodes in the "tens" scanner.

The "tens" and "units" scanners differ from the "line" scanner in that they each have a control grid. The grid bias of these two scanners is of such a value that the beam of each is suppressed except when the associated grid is triggered by the reduction of the negative bias normally produced by battery 64. For this reason electron beams 35 and 45 will be referred to as "phantom" beams. The deflecting coils (similar to coils 26—27 and 28—29) of the "tens" and "units" scanners function to drive the "phantom" beams in synchronism with the actual beam 25 of the "line" scanner. Consequently, when the grid of the "tens" or "units" scanner is triggered, the associated beam strikes the same anode point that the "line" beam is on at that instant.

For the purpose of simplifying the illustrations and facilitating the explanation, the various parts and circuits constituting the embodiment of the invention have been shown diagrammatically and certain conventional illustrations have been employed, the drawings having been made more with the purpose of making it easy to understand the principles and mode of operation than with the idea of illustrating the specific construction and arrangement of parts that would be employed in practice. Thus, the various relays and their contacts are illustrated in a conventional manner, with all of the contacts associated with each particular relay being illustrated as attached to that relay by means of a dashed line. The negative side of the usual common exchange battery is indicated by (—) and the positive side of the usual common exchange battery, which is usually grounded is indicated by (+). Certain other batteries, or sources of direct current, are employed in connection with the tube circuits, with the positive and negative terminals of these batteries being indicated by + and — symbols without the parentheses.

It is believed that the invention will best be understood by assuming that the subscriber at station #11 removes the receiver for initiating a call on line #11.

Removal of the receiver from the switch hook at station #11 causes current to flow from the + terminal of battery 36 through resistor 19, break contact of lockout relay LO11, break contact of cut-off relay CO11, line and substation circuits, break contact of relay CO11 and break contact of relay LO11 to the — terminal of battery 36, which is connected to ground.

The current flow over this circuit is through resistor 19 in the direction of the arrow, which establishes a less positive potential at the top terminal of this resistor, which terminal is connected to the #11 electrode in the "line" scanner. When beam 25 strikes anode 11 associated with the calling line, this anode now being more negative than normal, a current impulse is produced in the circular collector electrode 17 and flows through resistor 39 to the battery 24. This flow of current through resistor 39 is due to the fact that the voltage available for drawing secondary electrons to collector 17 is increased by the application of the less positive potential to electrode 11, due to the removal of the receiver at the calling station.

When the collector current impulse is transmitted through resistor 39, it is repeated to the grid of the amplifier start tube STT by means of the resistance-capacity coupling. The grid of tube STT is provided with a negative bias by means of battery 34 and the line scanner tube electrode 17 is provided with a positive bias from battery 24.

When the above mentioned impulse is applied to the grid of tube STT, this tube is triggered or fired for causing a current to flow in its output circuit extending from the + terminal of battery 37, break contact of common repeater relay CMP, conductor 14, lower winding of transformer 38, conductor 114, and anode-cathode circuit of tube STT to the other side of battery 37 by way of the ground connection.

This pulse in the output circuit of tube STT is repeated by way of the upper winding of transformer 38 to the grids (in parallel) of the "tens" and "units" scanner tubes. This impulse, amplified by tube STT and applied to the control grids of the "tens" and "units" scanners, is applied when phantom beam 35 and phantom beam 45 are in positions for striking the #1 terminal of the "tens" scanner and the #11 terminal of the "units" scanner respectively. This is effective to release the phantom beams and cause actual beams to strike these two terminals, thus causing these two tubes to become conducting.

The resistance unit 44 in the output of the "tens" scanner and the resistance unit 54 in the output of the "units" scanner provide a drop for the current flowing in the anode circuits of these tubes, which is effective to fire the associated tens and units gas tubes. In the present example, tens tube TT1 will be fired by the potential drop through resistor 44 and units tube UT1 will be fired by the drop through resistor 54.

It will be understood from the previous description that, in response to calls on other lines of the 100 line group, the "line," "tens" and "units" scanners will be fired when the beams of these tubes are in other locations. For example, if line #12 is calling, the "line" scanner will transmit a pulse through resistor 39 and fire tube STT when beam 25 strikes electrode 12. At this time, phantom beam 35 will be in position to strike electrode #1, while phantom beam 45 will be in a position for striking electrode 12, thus firing "tens" tube TT1 and units tube UT2.

Similarly, if line #22 is calling, beam 25 of the "line" scanner will transmit an impulse through resistor 39 and thus fire tube STT when beam 25 strikes electrode 22. The phantom beam 35 of the "tens" scanner will be positioned at this time to strike electrode 2, and phantom beam 45 will be positioned at the same time to strike electrode 22. The firing of tube SST causes a current flow through the primary winding of transformer 38, and the induced voltage in the secondary of this transformer drives the grids of the "tens" and "units" scanners positive. The phantom beams of these scanners, previously cut off, are consequently turned on, allowing beams 35 and 45 actually to strike electrodes 2 and 22, respectively. The resulting current pulses from these electrodes fire tubes TT2 and UT2, respectively, and this in turn causes relays TF2 and UF2 to operate, thus marking line #22 as being a calling line.

Referring back now to the present example, the firing of tubes TT1 and UT1 causes current to flow in their output circuits including resistors 74 and 84. Since relays 1TM and 1UM are in the anode-cathode circuits of these two tubes, these two relays are operated. It will be understood that there is a separate TM relay and a separate UM relay for each TT tube and each UT tube, respectively. Furthermore, common tens relay TC is connected in the output circuit of all tens marking tubes and common units relay UC is connected to the relays common to all of the units marking tubes. Consequently, relay TC is operated when any TM relay operates and relay UC is operated when any UM relay operates.

The operation of a gas filled tube, such as TT1, as above described, causes current to flow through its anode-cathode circuit and common resistor 74, thus due to the potential drop across resistor 74 to the voltage on the anode of each of the other tens tubes of the group is lowered, because the power supply to these other tubes is fed through common resistor 74. The resistance of resistor 74 is large compared to the resistance of the marking relay winding, such as relay 1TM. This arrangement provides a lockout for preventing the operation of more than one tens tube at any one time. It will be further noted that, although beam 25 of the "line" scanner may send additional pulses through resistor 39 due to other calls being initiated before the present calling line is selected, tube STT is conducting current through its anode-cathode circuit at this time, so that the initiation of calls on other lines is not effective to trigger the grids of the "tens" and "units" scanners, since there will be no transformer action through transformer 38 with tube STT conducting steady current.

The same lockout arrangement is provided for the units tubes, by supplying the anode-cathode voltage through common resistor 84 for providing a drop across this resistor when one of the units tubes becomes conducting, thus preventing the operation of another units tube until the one that is conducting is cleared out, as will be later described. In this manner, the first calling line anode of the "line" scanner which is struck by the electron beam will seize control of the entire marking circuit until this line has been cut through to an idle link in the manner to be later described.

With both relays TC and UC operated, a circuit is closed for operating relay 1ALG from (+) make contacts in series of relays UC and TC, conductor 115, break contact of guard relay GD of the allotter, break contact of allotter relay 1AL and winding of relay 1ALG (−). The operation of relay 1ALG (or any other ALG relay associated with some other idle link) closes an obvious circuit for operating relay GD. With relays 1TM and 1ALG operated, a circuit is closed for operating finder relay TF1 which extends from (+), winding of common relay CM, make contact of relay 1TM, conductor 116, make contact of relay 1ALG and winding of relay TF1 to (−). With relays 1UM and 1ALG operated, a circuit is closed for operating units finder relay UF1 which extends from (+), winding of relay CM, make contact of relay 1UM, conductor 117, make contact of relay 1ALG and winding of relay UF1 to (−). Relay CM is operated in series with the finder relays and closes an obvious circuit for operating common repeater relay CMP.

Since finder relays TF1 and UF1 are now operated, the calling line (assumed to be line #11) is extended through make contacts of these two finder relays to the windings of the calling bridge relay 1CB of the allotted link. Battery is supplied to the calling line through the windings of relay 1CB, consequently this relay is energized over the calling line circuit for closing an obvious circuit for operating slow acting relay 1SA.

Relay 1SA closes locking circuits for the operated finder relays, in this case extending from (+), make contact of relay 1SA, make contacts and windings of relays TF1 and UF1 in multiple to (−). It will be understood how other finder relays of this same allotted link are operated in response to calls from other lines, since other TM and UM relays are operated, as above described. Furthermore, this locking circuit for the operated finder relays is effective to lock any finder relays which are operated.

It will also be understood, from a reference to the above mentioned Patent 2,325,877, how other links are allotted by the circuit from (+) through make contacts of relays UC and TC being extended through make contacts of the AL relay or relays of the busy link or links to the ALG relay of the first idle link.

The operation of relay 1SA of the allotted link closes an obvious circuit over the associated allotter conductor AL for operating the associated allotter relay, in this example relay 1AL. This allotter relay allots the next link for the next call and remains operated as long as the link for this call is in use.

The operation of relay 1AL opens up and releases relay 1ALG, which in turn effects the release of relay GD. With the break contact of the make before break combination of relay GD closed, the circuit is prepared for operating the next ALG relay of the next idle link on the next call.

When relay 1SA applies (+) to the operating winding of the finder relay, or relays, this (+) is effective to short-circuit and release common relay CM, which in turn opens up and releases its repeater relay CMP. This provides the clearing out circuit for the actuated tubes, this circuit being effective to disconnect battery 37 from conductors 14, 94 and 104 during the time that relay CM is released and before relay CMP has released to close its break contacts.

With these conductors de-energized, as above mentioned, tubes STT, TT1 and UT1 are quenched because the D. C. supply is disconnected from their anode circuits. It will be understood that any TT or UT tube which is operated will be quenched in this same manner.

The quenching of these tubes, TT1 and UT1 for example, effects the release of their associated marking relays, 1TM and 1UM for example. Likewise, the quenching of the tens and units tubes opens up and releases common relays TC and UC.

This restores the common marking circuits to normal for use on the next call, it being understood that the connection of the + terminal of battery 37 to conductors 14, 94 and 104 by the break contacts of relay CMP again supplies energy to the marking tubes so that the next firing period is marked by the release of relay CMP.

The operation of relay 1SA, as above explained, also applies (+) through make contacts of relays UF1 and TF1 to sleeve conductor S of calling line #11 and since this conductor extends to the upper winding of relay CO11, the cut-off relay of the calling line is operated. The closure of the inner upper make contact of relay CO11 extends the sleeve conductor from the incoming end of the finder to the lower winding of lockout relay LO11 for operating this latter relay.

The operation of relay CO11 opens up the above described energizing circuit for the calling line, extending through resistor 19, thus restoring electrode 11 in the "line" scanner to normal.

Since the operations relating to the dialing, testing, ringing and talking in connection with the complete operation of the automatic system, after the link is selected, forms no part of the present invention, they have been omitted from the drawings and description.

When the connection is terminated and the calling party hangs up the receiver, relays 1CB and 1SA of the finder-connector link are released. The release of relay 1SA opens up the above described locking circuit for the finder relays for effecting the release of these relays. The release of relay 1SA also disconnects (+) from conductor S of the calling line for effecting the release of relays CO11 and LO11 in sequence. Relay LO11 is slow to release, to provide for line lockout.

If this is a reverting call, sleeve conductor S is disconnected from (+) at the link while the receiver is still off the hook at the substation associated with this line. Consequently, the release of relay CO11 extends the closed circuit of station #11, for example, by way of break contacts of relay CO11 and make contacts of relay LO11 to the (+) and (—) terminals of the exchange battery, through the windings of relay LO11. This holds relay LO11 operated to prevent marking this line as calling and to mark this line busy by the application of (+) to conductor S of the connector multiple at the lower make contact of relay LO11.

It will be obvious that a permanent on a calling line which is timed out for placing the line circuit in a locked out condition, is effective in a similar manner, since (+) battery is removed from sleeve conductor S in the link circuit.

When the station in a locked out condition replaces the receiver, or when the permanent condition is cleared, the line circuit is opened for releasing relay LO11 and restoring the line circuit to normal.

Having described an electronic marking system as particularly adaptable for use in automatic telephone systems as one specific embodiment of the present invention, it is desired to be understood that this form is selected to facilitate the disclosure of the invention rather than to limit the number of forms which it may assume and it is to be further understood that various modifications, adaptations and alterations may be applied to the specific form shown to meet the requirements of practice, without in any manner departing from the spirit or scope of the present invention except as limited by the appended claims.

What I claim is:

1. In a telephone system; a plurality of lines arranged in primary sets according to their tens numerical value and in secondary sets according to their units numerical value; a plurality of links; a line finder associated with each of said links comprising a plurality of tens and a plurality of units relays; a plurality of tens marking relays and a plurality of units marking relays common to all of said links; an electronic scanner comprising line, tens and units scanning beams; an output circuit from said line scanner for each of said lines; an output circuit from said tens scanner for each primary set of lines; an output circuit from said units scanner for each secondary set of lines; means controlled over the circuit of a calling line for marking its identity in said line scanner; means controlled over the output circuit of said line scanner for marking the tens numerical value of said calling line in said tens scanner and the units numerical value of said calling line in said units scanner; means controlled over the output circuits of said tens and units scanners for selectively operating said marking relays; and means responsive to the operation of said marking relays for selectively operating the tens and units relays of an idle line finder for connecting said calling line to an idle link.

2. In a telephone system; a plurality of lines arranged in primary sets according to their tens numerical value and in secondary sets according to their units numerical value; a plurality of links; a line finder associated with each of said links comprising a plurality of tens and a plurality of units relays; a plurality of tens marking relays and a plurality of units marking relays common to all of said links; an electronic scanner comprising line, tens and units scanning beams; an output circuit from said line scanner for each of said lines; an output circuit from said tens scanner for each primary set of lines; an output circuit from said units scanner for each secondary set of lines; means controlled over the circuit of a calling line for marking its identity in said line scanner; means controlled over the output circuit of said line scanner for marking the tens numerical value of said calling line in said tens scanner and the units numerical value of said calling line in said units scanner; means controlled over the output circuits of said tens and units scanners for selectively operating said marking relays; means responsive to the operation of said marking relays for selectively operating the tens and units relays of an idle line finder for connecting said calling line to an idle link; and lockout means for preventing the operation of more than one tens and more than one units marking relays at any one time.

3. In a telephone system; a plurality of lines arranged in primary groups in accordance with a first numerical value and in secondary groups in accordance with a second numerical value; a link having an associated line finder, said finder having primary relays corresponding to the first numerical value of said lines and secondary relays corresponding to the second numerical value of said lines; a first electronic scanner and a second electronic scanner having scanning beams operating in synchronism; means controlled over a calling line for marking its first numerical value in said first scanner and for marking its second numerical value in said second scanner; and means controlled by the beams of said scanners for selectively operating said primary and secondary finder relays, whereby said link is connected to said calling line.

4. In a telephone system; a plurality of lines arranged in primary groups in accordance with a first numerical value and in secondary groups in accordance with a second numerical value; a plurality of links each having an associated line finder, each of said finders having primary relays corresponding to the first numerical value of said lines and secondary relays corresponding to the second numerical value of said lines; a first electronic scanner and a second electronic scanner having scanning beams operating in synchronism; means controlled over a calling line for marking its first numerical value in said first scanner and for marking its second numerical value in said second scanner; and means controlled by the beams of said scanners for selectively operating the primary and secondary finder relays of any one of said links, whereby any one of said links may be connected to said calling line.

5. In a telephone system; a plurality of incoming lines; a link; said link comprising a plurality of groups of relays and said link terminating in contacts of one of said groups of relays; said incoming lines terminating in contacts of another of said groups of relays, said incoming lines coordinately arranged in primary rows extending in one direction and in secondary rows extending at right angles to said primary rows; a common electronic scanner having a primary pulsing path for the incoming lines in each primary row and a secondary pulsing path for the incoming lines in each secondary row; means responsive to a call initiated over a calling incoming line for causing said electronic scanner to activate the primary and secondary pulsing paths corresponding to the identity of said calling line; and means responsive to the activation of said primary and secondary pulsing paths for interconnecting the contacts of said calling line with said link.

6. In a telephone system; a plurality of incoming lines; a link; said link comprising a plurality of groups of relays and said link terminating in contacts of one of said groups of relays; said incoming lines terminating in contacts of another of said groups of relays, said incoming lines coordinately arranged in primary rows extending in one direction and in secondary rows extending at right angles to said primary rows; a common electronic scanner having a primary pulsing path for the incoming lines in each primary row and a secondary pulsing path for the incoming lines in each secondary row; means responsive to a call initiated over a calling incoming line for causing said electronic scanner to activate the primary and secondary pulsing paths corresponding to the identity of said calling line; and means including a plurality of space discharge devices responsive to the activation of said primary and secondary pulsing paths for interconnecting the contacts of said calling line with said link.

7. In a telephone system, a line, a link circuit, switching means for extending connections from said line to said link circuit comprising a plurality of tens and a plurality of units relays, electronic devices comprising synchronously operating electron beams, a source of potential operating the electron beams of said electronic devices, and means effective in response to the initiation of a call on said line for controlling the operation of one of said tens and one of said units relays to connect said line to said link circuit, said last-named means including said electronic devices.

8. In a telephone system, a plurality of lines, a plurality of link circuits, switching means for extending connections from said lines to said link circuits comprising a plurality of tens and a plurality of units relays for each of said link circuits, electronic devices comprising synchronously operating electron beams effective in response to the initiation of a call on any one of said lines for controlling the selective operation of one of said tens and one of said units relays of an allotted link circuit to connect a calling line to the allotted link circuit, and means for allotting said link circuits for use by said calling lines.

9. In a telephone system, a plurality of lines, a plurality of link circuits, switching means for extending connections from said lines to said link circuits comprising a plurality of tens and a plurality of units relays for each of said link circuits, electronic devices comprising synchronously operating electron beams effective in response to the initiation of a call on any one of said lines for controlling the selective operation of one of said tens and one of said units relays over an allotted link circuit to connect a calling line to the allotted link circuit, means for allotting said link circuits for use by said calling lines, and lockout means for preventing the operation of more than one of said tens or more than one of said units relays at any one time.

10. In a telephone system, a plurality of incoming lines terminating in primary and secondary groups, a link, a primary electron discharge tube having a discharge path common to all incoming lines in one of said primary groups, a secondary electron discharge tube having a discharge path common to all incoming lines in one of said secondary groups, a common scanning electron discharge tube having a discharge path individual to each of said incoming lines, means responsive to the initiation of a call on one of said incoming lines for completing the associated individual discharge path in said scanning tube, means responsive to the completion of said individual discharge path for effecting the completion of the discharge paths in said primary and said secondary discharge tubes, and means controlled by the completion of the discharge paths in said primary and said secondary discharge tubes for effecting the connection of said calling line to said link.

11. In a telephone system, a plurality of incoming lines terminating in co-ordinately arranged primary and secondary rows, a link, a primary electron discharge tube having a discharge path common to all incoming lines in one of said primary rows, a secondary electron discharge tube having a discharge path common to all incoming lines in one of said secondary rows, a common scanning electron discharge tube having a discharge path individual to each of said incoming lines, means responsive to the initiation of a call on one of said incoming lines for completing the associated individual discharge path in said scanning tube, means responsive to the completion of said individual discharge path for effecting the simultaneous completion of the discharge paths in said primary and said secondary discharge tubes, and means controlled by the completion of the discharge paths in said primary and said secondary discharge tubes for connecting said calling line to said link.

12. In a telephone system, a plurality of incoming lines terminating in co-ordinately arranged primary and secondary rows, a link, a primary electron discharge tube having a discharge path common to all incoming lines in one of said primary rows, a secondary electron discharge tube having discharge paths common to all incoming lines in one of said secondary rows, a common scanning electron discharge tube having a discharge path individual to each of said incoming lines, means responsive to the initiation of a call on one of said incoming lines for completing the associated individual discharge path in said scanning tube, means responsive to the completion of said individual discharge path for effecting the simultaneous completion of the discharge paths in said primary and said secondary discharge tubes, means controlled by the completion of the discharge paths in said primary and said secondary discharge tubes for connecting said calling line to said link, and lockout means for preventing the completion of more than one discharge path in any one of said discharge tubes at any one time.

13. In a telephone system, a calling line identified by a particular tens digit and a particular units digit, a link, a line finder for connecting said link to said calling line, a tens marking relay corresponding to said tens digit, a units marking relay corresponding to said units digit, an electronic scanner including an electron beam, said electronic scanner also including a target corresponding to said line, a source of potential, means including said source of potential for causing the beam of said scanner to scan said target, means including said beam and said target operative in response to a call from said line for operating said tens and units marking relays, and means including said line finder operated in response to the operation of said tens and units marking relays for connecting said link to said calling line.

14. In a telephone system a plurality of calling lines each identified by a particular tens digit and a particular units digit, a link, a line finder for connecting said link to any one of said calling lines, a plurality of tens marking relays corresponding to the tens digits of said lines, a plurality of units marking relays corresponding to the units digits of said lines, an electronic scanner including an electron beam, said electronic scanner also including a plurality of targets each corresponding to one of said lines, a source of potential, means including said source of potential for causing the beam of said scanner to sequentially scan each of said targets, means including said beam and said targets operative in response to a call from any one of said lines for operating the particular tens and units marking relays corresponding to the tens and units digits respectively of the particular calling line, and means including said line finder operated in response to the operation of said tens and units marking relays for connecting said link to said particular calling line.

15. In a telephone system, a calling line identified by a particular tens digit and a particular units digit, a link, a line finder for connecting said link to said calling line, a tens marking means corresponding to said tens digit, a units marking means corresponding to said units digit, an electronic scanner including an electron beam, said electronic scanner also including a target corresponding to said line, a source of potential, means including said source of potential for causing the beam of said scanner to periodically scan said target, means including said beam and said target operative in response to a call from said line for operating said tens and said units marking means, and means including said line finder operated in response to the operation of said tens and said units marking means for connecting said link to said calling line.

WINFRED T. POWELL.

REFERENCES CITED

The following references are of record in the file of this patent:

UNITED STATES PATENTS

| Number | Name | Date |
|---|---|---|
| 2,204,055 | Skellett | June 11, 1940 |
| 2,279,531 | Saunders | Apr. 14, 1942 |
| 2,301,748 | Renshaw | Nov. 10, 1942 |
| 2,410,304 | Powell | Oct. 29, 1946 |